US008213586B2

(12) United States Patent
Sångberg et al.

(10) Patent No.: US 8,213,586 B2
(45) Date of Patent: Jul. 3, 2012

(54) SYSTEM, METHOD, AND DEVICES FOR ALLOCATING COMMUNICATIONS-RELATED CHARGES

(75) Inventors: Troed Nils Rickard Sångberg, Malmö (SE); Patrik Seger, Malmö (SE)

(73) Assignee: Sony Mobile Communications AB, Lund (SE)

( * ) Notice: Subject to any disclaimer, the term of this patent is extended or adjusted under 35 U.S.C. 154(b) by 1296 days.

(21) Appl. No.: 11/872,151

(22) Filed: Oct. 15, 2007

(65) Prior Publication Data
US 2009/0097624 A1    Apr. 16, 2009

(51) Int. Cl.
*H04M 15/00*  (2006.01)
*H04M 3/42*  (2006.01)
(52) U.S. Cl. .......... 379/114.21; 379/114.22; 379/210.01
(58) Field of Classification Search ............. 379/114.21, 379/114.22, 142.04, 210.01
See application file for complete search history.

(56) References Cited

U.S. PATENT DOCUMENTS

| | | | | |
|---|---|---|---|---|
| 6,009,155 A | * | 12/1999 | Adachi | 379/114.21 |
| 6,154,530 A | * | 11/2000 | Letellier | 379/142.06 |
| 6,154,532 A | * | 11/2000 | Lockhart et al. | 379/143 |
| 6,775,365 B1 | * | 8/2004 | Norby | 379/143 |

FOREIGN PATENT DOCUMENTS

EP    0795992 A    9/1997

OTHER PUBLICATIONS

PCT International Search Report mailed Mar. 5, 2009 for International Application No. PCT/EP2008/057859.

* cited by examiner

*Primary Examiner* — Quoc D Tran
(74) *Attorney, Agent, or Firm* — Coats & Bennett, P.L.L.C.

(57) ABSTRACT

Methods, systems, and devices for allocating communications-related charges are disclosed. In an exemplary method, a communications device receives notification of an uncompleted incoming call attempt, the notification including a calling a party identifier. The communication device retrieves a call attempt descriptor associated with the uncompleted incoming call, the call attempt descriptor comprising charge-back data. In response to the initiation of a return call to the calling party, the communication device sends a charge-back message, comprising all or part of the charge-back data, to a charge allocation server for use in allocating charges relating to the return call. An exemplary system, including a charge allocation server, for implementing the disclosed methods is also disclosed.

20 Claims, 5 Drawing Sheets

SYSTEM, METHOD, AND DEVICES FOR ALLOCATING COMMUNICATIONS-RELATED CHARGES

BACKGROUND

The present invention relates generally to communications systems and more particularly to a method for allocating communications-related charges.

In a communications system, a called party (User B) is occasionally unable or unwilling to accept an incoming call from a calling party (User A), but may wish to engage in a communication session with the calling party at a later time. However, in many circumstances, returning the call may result in the originally called party, User B, being subject to charges. For instance, in some locations, calling a mobile telephone imposes charges for the wireless service upon the calling party. Even in jurisdictions where this calling-party-pays approach is not prevalent, such as the United States, return calls may nonetheless impose charges on User B, such as for long-distance tolls.

Under these circumstances, User A, who placed the original call, may desire that charges for a subsequent return call be reversed. In other words, User A may wish that all or part of the charges that would normally accrue to User B for the return be charged instead to User A. This may be particularly useful in a business context, where the likelihood of a returned call might be dramatically decreased if the originally-called party is required to pay for the return call. A system that allows charges for a returned call to be automatically re-allocated between the parties would thus improve the chances of a return call.

SUMMARY

Methods, systems, and devices for allocating communications-related charges are disclosed. In an exemplary method, a communications device receives notification of an uncompleted incoming call attempt, the notification including a calling party identifier. The communication device retrieves a call attempt descriptor associated with the uncompleted incoming call, the call attempt descriptor comprising charge-back data. In response to the initiation of a return call to the calling party, the communication device sends a charge-back message, comprising all or part of the charge-back data, to a charge allocation server for use in allocating charges relating to the return call.

In another exemplary method, a call attempt descriptor, including charge-back data, is generated in response to an uncompleted call attempt from a calling party to a called party, and provided to the called party's communication device. A charge-back message, including all or part of the charge-back data, is subsequently received from the called party's communication device, and used to allocate charges related to a return call from the called party to the calling party. The charge-back message may comprise an encrypted or digitally signed version of the charge-back data.

The various aspects of the invention may be used alone or in any combination, as is desired. In addition, corresponding devices are also described.

DETAILED DESCRIPTION

Figure 1:
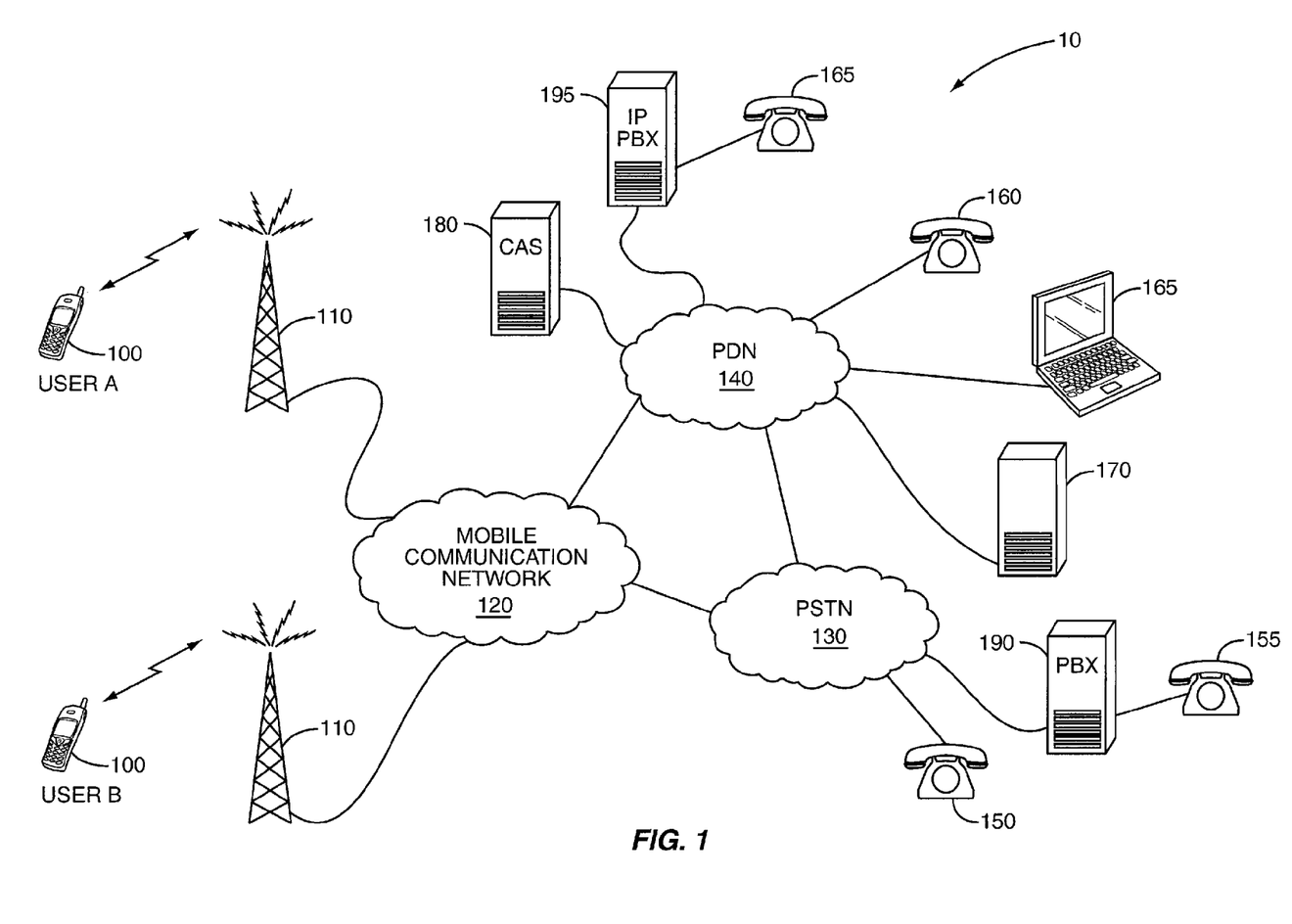
FIG. 1 illustrates an exemplary communication network.

Referring now to the drawings, the present invention will be described in the context of a communication network 10 as shown in FIG. 1. Communication network 10 comprises a mobile communication network 120 having one or more base stations or wireless access points 110 for communicating with mobile terminals 100. Mobile terminals 100 may comprise, for example, cellular telephones, personal digital assistants, laptop computers, or other mobile communications devices. Mobile communication network 120 is connected to the public switched telephone network (PSTN) 130 and to a packet data network (PDN) 140. PSTN 130 is a circuit-switched network providing both voice and data communications, and in particular provides voice service to traditional telephones such as telephone 150. PDN 140 comprises a packet-switched network that implements known protocols, such as conventional Internet protocols, for routing packets of data from one end point to another. PDN 140 may comprise a public or private network, and may be a wide-area, a local-area network or a combination of both. The Internet is one well-known example of a PDN 140. Among the services that may be provided using PDN 140 are packet-switched voice services, such as so-called Voice-over-Internet-Protocol, or VoIP, services. Using VoIP technology, digital devices such as Internet phone 160 may conduct voice calls with other VoIP devices or with traditional phones such as telephone 150.

One or more enterprise telephones 155, 165 may be connected to PSTN 130 and PDN 140, respectively, via a PBX 190 or IP PBX 195. Those skilled in the art will appreciate that PBX 190 and IP PBX 195 may provide a connection between an organization, such as a business, and PSTN 130 and PDN 140, and may provide a variety of services such as call forwarding, call transfer, call parking, voicemail, call queuing, recording and monitoring, and so on.

One or more servers 170,180 are accessible to the mobile terminals 100 via the mobile communication network 120 and PDN 140. Servers 170,180 are also available to digital phone 160, as well as to other digital devices such as laptop 165, via PDN 140. The servers 170,180 may, for example, comprise web servers, email servers, file servers, or other types of servers. In some embodiments, server 180 may function as a charging allocation server (CAS) 180, as will be described in further detail below. Servers 170,180 may be accessible to the mobile communication network 120 via the PDN 140, or accessible to the PDN 140 via the mobile communication network 120, or a combination thereof.

Figure 2:
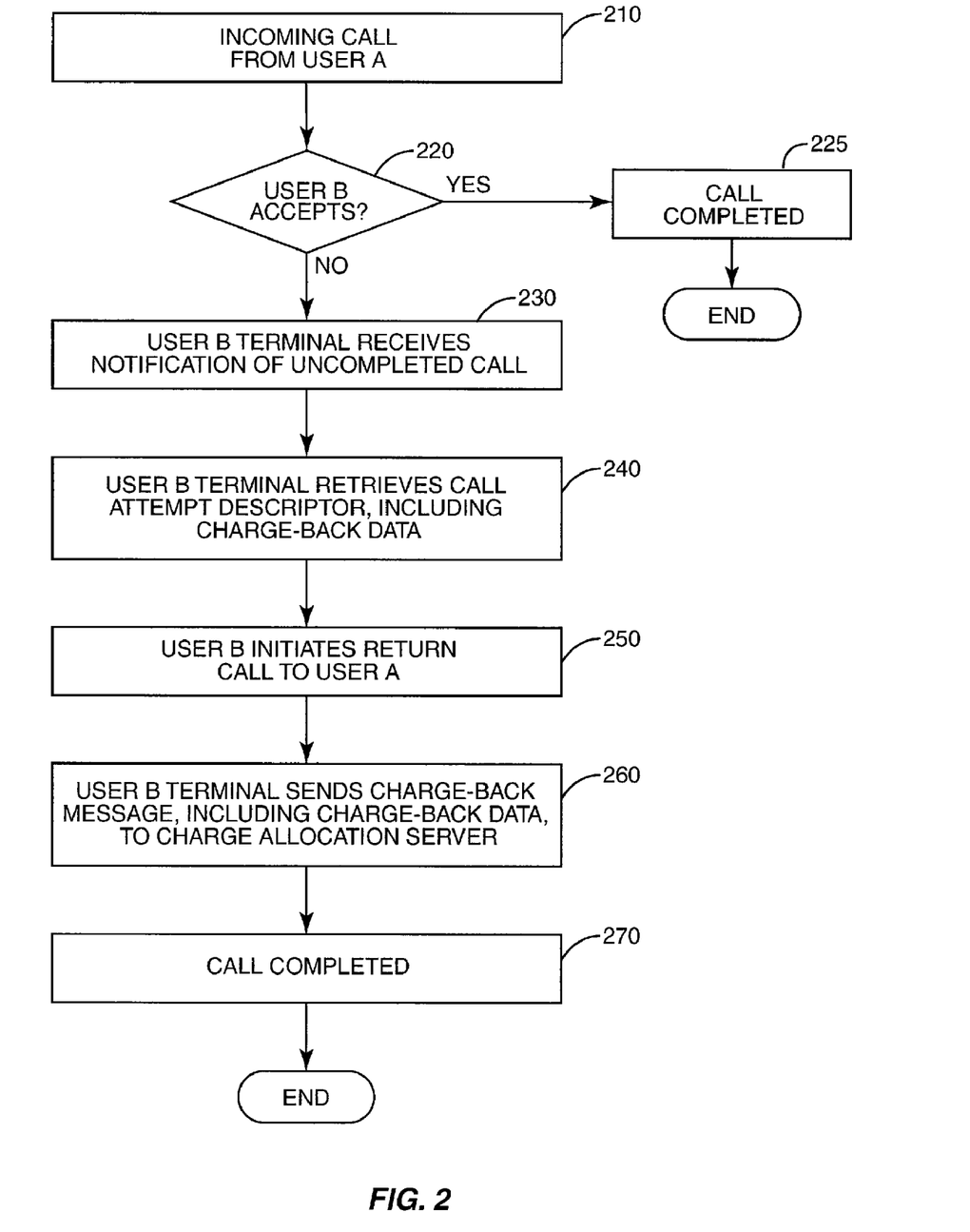
FIG. 2 shows a flow diagram of an exemplary method for allocating communications-related charges.
Figure 3:
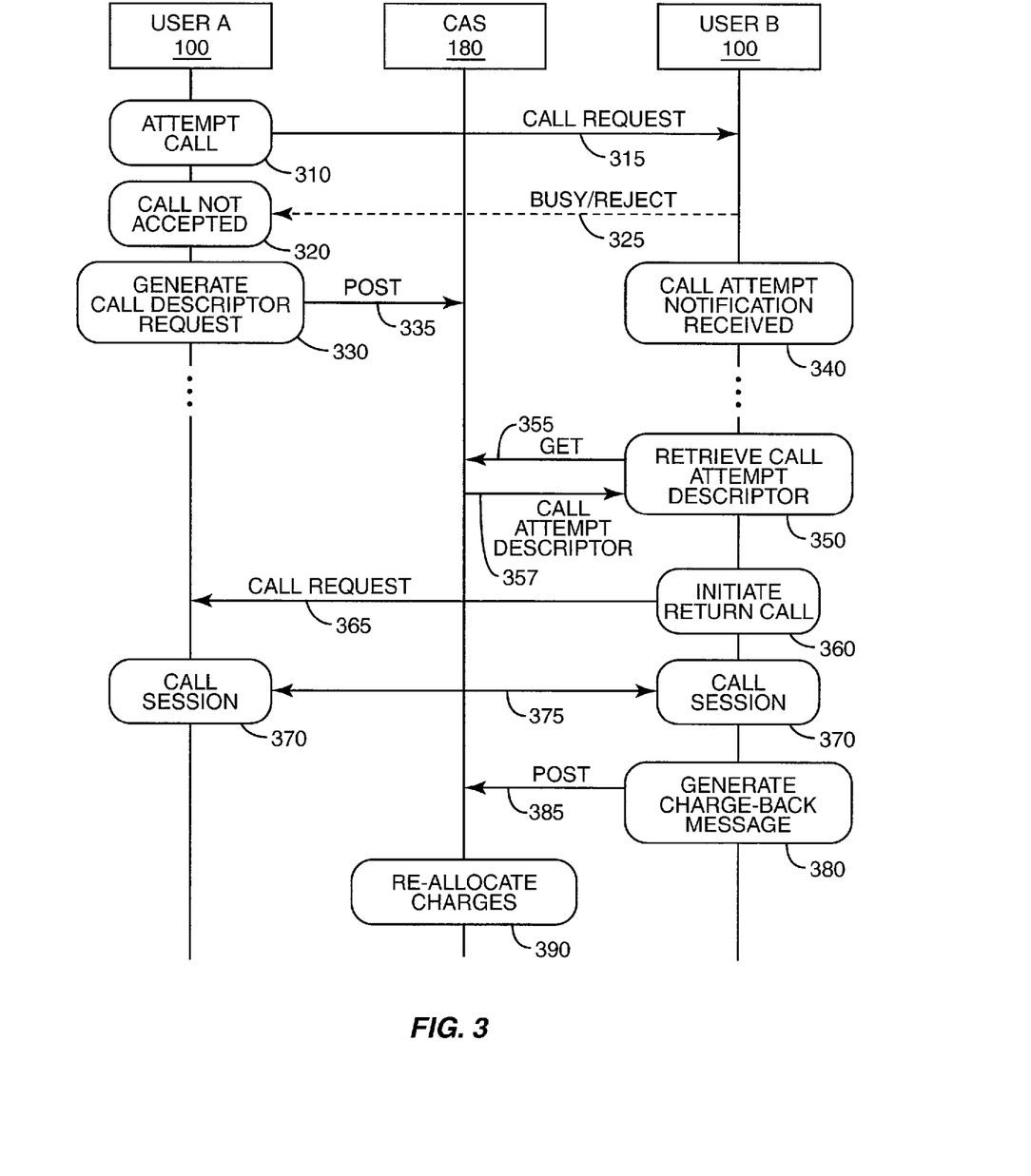
FIG. 3 shows an exemplary signal flow according to one or more embodiments of the invention.

FIG. 2 illustrates a general method for allocating communications charges when a called party is unable or unwilling to accept an incoming call, and FIG. 3 shows a corresponding signal flow diagram. Although the method illustrated in FIGS. 2 and 3 is described below with reference to the system components of FIG. 1, those skilled in the art will recognize that the described method is applicable to a variety of systems and network topologies.

The method of FIG. 2 begins at block 210 with User B receiving an incoming call attempt from User A. For example, User A utilizes his mobile terminal 100 to place a voice call, video call, or push-to-talk (PTT) call to the mobile terminal 100 associated with User B. User B may either accept the request or not accept the request. As shown at decision block 220, if User B accepts the call request then a call is completed in a conventional manner between the mobile terminals 100 at block 225, and the procedure ends. However, User B is not always able to accept the request. For example, User B may be unable to accept the request due to being busy on another call, in which case a busy signal may be automatically sent to User A's mobile terminal 100. In some cases, User B may be unwilling to accept the call from User A for any of a variety of reasons, and may therefore actively decline the request (e.g., by pressing a "call reject" button on mobile terminal 100). In other instances, User B may be away from his mobile terminal 100. In this case, User A may hang up after several rings, or the call attempt may be automatically terminated after a predetermined time. In any event, a failure to accept the attempted call results in User B's device 100 receiving a notification of an uncompleted call at block 230. This notification includes a calling party identifier corresponding to User A, and may optionally include additional information such as the time at which the call was attempted.

A number of methods for providing a notification of an uncompleted call, or missed call notification, are well known to those skilled in the art. Some implementations utilize calling line identification (CLI) or calling number identity (CNI) technology. Others, some of which are capable of providing missed call notifications for calls attempted while the called mobile telephone is turned off, rely on SMS messages generated at a network-connected server in response to a missed call. Common to all of these approaches is that the missed call notification includes at least a calling party identifier, typically a phone number. In some instances, the missed call notification includes additional information, such as a calling party name.

At block 240, User B's mobile terminal 100 retrieves a call attempt descriptor related to the missed call. The call attempt descriptor, as will be discussed further below, is generated in response to the failed call attempt, and includes charge-back data for use in allocating charges in a return call. The call attempt descriptor may contain various other information, such as the name and phone number of the calling party, the time and date of the failed call attempt, an alternate number to be used for returning the call, suggested times for returning the call, a reason for the call attempt, and so on. Some or all of the call attempt descriptor may be displayed for User B using a user interface of User B's mobile terminal; this display may be automatically produced upon receipt of the call attempt descriptor, triggered by a return call, and/or triggered by selection of an identifier for the calling party in a locally stored electronic phone book.

In one or more embodiments, the call attempt descriptor is generated by the calling communication device, e.g., User A's mobile terminal 100, and stored in a database at a server accessible to the called communication device, such as charge allocation server 180. In these embodiments, User B's mobile terminal 100 retrieves the call attempt descriptor by sending a descriptor request message to charge allocation server 180. This descriptor request typically comprises the calling party identifier (associated with the calling communication device) and an identifier associated with the called party, e.g., the called phone number. The descriptor request may also include other information, such as date and/or time information, to make each call attempt uniquely identifiable. These identifiers and any other data included in the descriptor request may be used by the server to retrieve the call attempt descriptor from several such descriptors indexed by calling and called party identifiers. Those skilled in the art will recognize that conventional means for requesting and receiving data from a network-connected server may be used to retrieve the call attempt descriptor. For instance, HTTP (Hypertext Transfer Protocol) "GET" or "POST" commands sent to a predetermined Uniform Resource Locator (URL) may be used to retrieve the call attempt descriptor.

In other embodiments, the call attempt descriptor may be automatically sent to the called communication device (e.g., User B's mobile terminal 100) as an electronic message, either by the calling terminal (e.g. User A's mobile terminal 100), or by a server, such as charge allocation server 180. This electronic message may be an e-mail message, an SMS (Short Message Service) or MMS (Multimedia Message Service) message, or the like, and may include any or all of the information discussed above, such as calling/called parties' names and numbers, time and date, etc. In these embodiments the call attempt descriptor is retrieved by extracting the call attempt descriptor from the electronic message.

At block 250, in response to input from User B, User B's mobile terminal 100 initiates a return call to User A. The return call need not necessarily use an identical technology or operating mode as used for the original call attempt. For example, even if the original call attempt was originally a video call attempt, the return call might nonetheless be an ordinary voice call. While the original call attempt may have been made via the PSTN 130, the return call might be placed using VoIP, over PDN 140.

In some embodiments, the initiation of the return call triggers the retrieval of the call attempt descriptor described above. In others, the retrieval of the call attempt descriptor is triggered instead by the receipt of the missed call notification of block 230. In still others, User B's mobile terminal 100 may be configured to periodically request any pending call attempt descriptors stored at charge allocation server 180. Accordingly, those skilled in the art will appreciate that the steps of blocks 240 and 250 may be performed in any order.

Those skilled in the art will also appreciate that the return call of block 250 may be initiated in response to User B manually entering the phone number for User A's mobile terminal 100, or by any of a variety of automatic or semi-automatic means. For instance, User B's mobile terminal 100 may be configured to permit User B to select the calling party identifier (e.g. phone number) in the missed call notification described above, and to initiate the return call upon such selection. Alternatively, User B may select User A's phone number from a list of missed calls, or from a phone book stored in User B's mobile terminal 100 or on a server 170, 180. In some embodiments, the call attempt descriptor may include a call-back identifier that differs from the calling party identifier in the missed call notification; in these embodiments the return call may be initiated using the call-back identifier rather than a phone number identified in the missed call notification message.

At block 260, User B's mobile terminal 100 sends a charge-back message to charge allocation server 180, for use in allocating charges related to the return call. The call is completed at block 270 and, as discussed above, may incur charges based on the call's duration, the call's destination, or other factor. Thus, the charge-back message is used by charge allocation server 180 to allocate these charges between the parties. In many cases, all of the relevant charges are allocated to User A, the party originally attempting to place the call, although other allocations are possible. In any event, the charge-back message includes all or part of the charge-back data included in the call attempt descriptor retrieved at block 240, although in some embodiments the charge-back data may be encrypted and/or digitally signed before it is included in the charge-back message. User B's mobile terminal 100 may in some embodiments send the charge-back message to the charge allocation server 180 using a pre-determined address, such as an Internet Protocol (IP) address or a Uniform Resource Locator (URL). In other embodiments, an address for the charge allocation server may be included in the call attempt descriptor and used for addressing the charge-back message.

In a typical embodiment, the initiation of any call by User B's mobile terminal 100 will trigger a search for relevant call attempt descriptors, so that a charge-back message can be sent in appropriate circumstances. This search may include a search of local memory for User B's mobile terminal 100 for previously retrieved call attempt descriptors or a request to charge allocation server 180 for relevant call attempt descriptors, or both. Stored call attempt descriptors, whether stored locally or at charge allocation server 180, are indexed by or otherwise associated with the calling party identifier, so that they may be correctly associated with the return call. In some embodiments, a call attempt descriptor may include a validity period or expiration time, so that the charge-back data is only usable for a specific period of time. In these embodiments, stored call attempt descriptors might be discarded when the validity period expires.

FIG. 3 presents an exemplary signal flow, illustrating communications between the various components of an exemplary system for implementing the inventive methods disclosed herein. FIG. 3 illustrates signals flowing between User A's mobile terminal 100, User B's mobile terminal 100, and charge allocation server 180. Of course, other system configurations are possible, as will be apparent to those skilled in the art.

At block 310, User A attempts a call to User B, triggering a conventional call request message 315. As the methods disclosed herein are applicable to a variety of phone types, call request 315 may comprise analog signaling, digital signaling, or both, as the call request proceeds through mobile communication network 120, PSTN 130, and/or PDN 140.

At block 320, User A's mobile terminal 100 determines that the call attempt is unsuccessful, i.e., that the call was not accepted by User B's mobile terminal 100. As explained above, an uncompleted call attempt may occur for several reasons. In some cases, User A's mobile terminal 100 will automatically determine that the call attempt is unsuccessful, due to the passage of a pre-determined time interval. Alternatively, User A may discontinue the call attempt manually. In other instances, User A's mobile terminal 100 may receive a signal that the call was not accepted. For instance, a "busy" indication, "rejected" indication, or "voice mail" indication might be received, as shown by the "Busy/Reject" message 325 in FIG. 3. Although the "Busy/Reject" message 325 is illustrated as originating at User B's mobile terminal 100, a similar message might be originated instead in the mobile communication network 120, PSTN 130, or PDN 140.

In response to the failed call attempt, User A's mobile terminal 100 generates a call attempt descriptor, at block 330, and sends the call attempt descriptor to charge allocation server 180. In the exemplary embodiment of FIG. 3, a "POST" message is used, as illustrated at 335, but other methods for sending the call attempt descriptor may be used. Accordingly, in this embodiment, one or more call attempt descriptors are stored in charge allocation server 180 for later retrieval. In other embodiments, the call attempt descriptors might be sent immediately to User B's mobile terminal 100, using, for example, an SMS or e-mail message.

Meanwhile, User B's mobile terminal 100 has received a call attempt notification at block 340. In a typical embodiment, the call attempt notification is generated automatically by User B's mobile terminal 100 upon determination that an incoming call is not answered. In this case, the calling party identification is typically derived from conventional CLI/CNI signaling between mobile terminal 100 and mobile communication network 120. In other embodiments, or under different circumstances, a call attempt notification might be sent from a network node to User B's mobile terminal 100. This latter approach might be used, for example, to notify a recently-powered mobile terminal that one or more calls were missed while the mobile terminal was powered off.

At block 350, User B's mobile terminal 100 retrieves the call attempt descriptor stored at charge allocation server 180, by sending a descriptor request 355. The call attempt descriptor is returned at 357. As noted earlier, in some embodiments the retrieval of the call attempt descriptor is triggered by the call attempt notification, while in others the retrieval is triggered by initiation of a phone call. In others, retrieval of call attempt descriptors might be performed periodically, and/or upon powering on a mobile terminal. In yet other embodiments the notification of an uncompleted call attempt and the call attempt descriptor may be included in the same message.

At block 360, User B's mobile terminal 100 initiates a return call to User A by sending call request signaling 365. Again, this signaling is performed by conventional means. In response, an active call session 370 is established at each mobile terminal 100, and a conversation 375 ensues.

At block 380, User B's mobile terminal 100 generates and posts (in this embodiment, using "POST" message 385) a charge-back message. Although this charge-back message may be sent before the return call is completed, it is advantageously delayed in the embodiment illustrated by FIG. 3, so that the charge-back message is only sent in the event that the return call is successfully placed, i.e., only in the event that charges are actually accrued. Thus, at block 390, charge allocation server 180 receives the charge-back message, and uses it to re-allocate charges related to the successfully placed return call.

Figure 4:
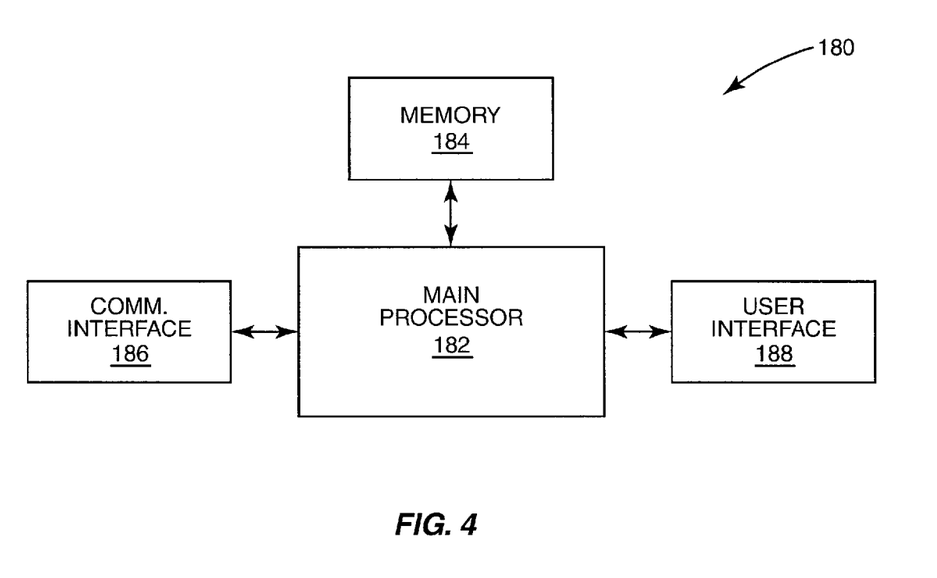
FIG. 4 shows a block diagram illustrating functional components of a server according to one or more embodiments of the present invention.

FIG. 4 illustrates an exemplary charge allocation server 180 that may be used in implementing some of the inventive methods described herein. Charge allocation server 180 of FIG. 4 comprises a processor 182, memory 184, and a communication interface 186. Processor 182 controls the operation of the charge allocation server 180 and may comprise one or more microprocessors, microcontrollers, hardware circuits, or a combination thereof. Memory 184 stores applications executed by processor 182, and may store call attempt descriptors or other data in some embodiments. Memory 184 may comprise one or more discrete memory devices, including read-only memory devices, random access memory, flash memory, etc. Memory 184 may further include mass storage devices, such as optical or magnetic storage devices. Stored applications may include operating system applications and/or server applications. Communication interface 186, such an Ethernet interface, connects charge allocation server 180 to the packet data network 140. Server 180 may further include a user interface 188 to enable maintenance by the operator of the server 180.

While FIG. 4 illustrates an exemplary server 180 residing a single location, it should be understood that the functionality of charge allocation server 180 may be distributed among a plurality of locations. Thus, for example, a portion of server 180 may reside in one or both of the mobile terminals 100 of User A and/or User B. Thus, while it may be advantageous if charge allocation server 180 is distinct from mobile terminals 100, such is not required in all embodiments of the present invention.

In several embodiments, charge allocation server 180 performs at least two functions. First, charge allocation server 180 stores a call attempt descriptor generated in response to an uncompleted call attempt, and provides it to the called terminal. The call attempt descriptors may be provided by means of e-mail, SMS, or MMS messages (or the like), i.e., "pushed" to the called terminals, or provided in response to specific descriptor requests ("pulled"). Second, charge allocation server 180 receives and processes charge-back messages from calling terminals for allocating charges related to return calls.

Those skilled in the art will appreciate that charge allocation server 180 is connected to or integrated with one or more billing systems associated with mobile communication network 120, PSTN 130, and/or PDN 140. Charge allocation server 180 may be configured to receive information describing call transactions, for matching to the charge-back messages. In some embodiments, charge-back data included in the charge-back messages may be encrypted and/or electronically signed for authentication purposes; charge allocation server 180 is configured in these embodiments to decrypt the charge-back data and/or verify the electronic signature to ensure that the charge-back is authorized. In some embodiments, the charge-back data includes information defining a validity period; charge allocation server 180 may be configured in these embodiments to verify that the return call was placed during the applicable validity period. In some embodiments, the charge-back data may include allocation information specifying how charges are to be allocated between the calling and called parties, while in other embodiments the lack of such information will indicate that all charges are to be allocated to the original calling party. In either case, the charge allocation server 180 is configured to match the charge-back message to the appropriate return call, and to either re-allocate the applicable charges or instruct a separate billing system to re-allocate the applicable charges.

In various embodiments, the charge-back data may include priority data, perhaps in the form of a token, to be used for prioritizing the associated return call. In some embodiments, this priority data is supplied to PBX 190, for example, for use in routing the return call. The priority data may indicate that the return call should be routed so as to bypass a queuing system, for example, or may indicate that the return call should be routed to a particular phone extension or extension group inside PBX 190.

Figure 5:
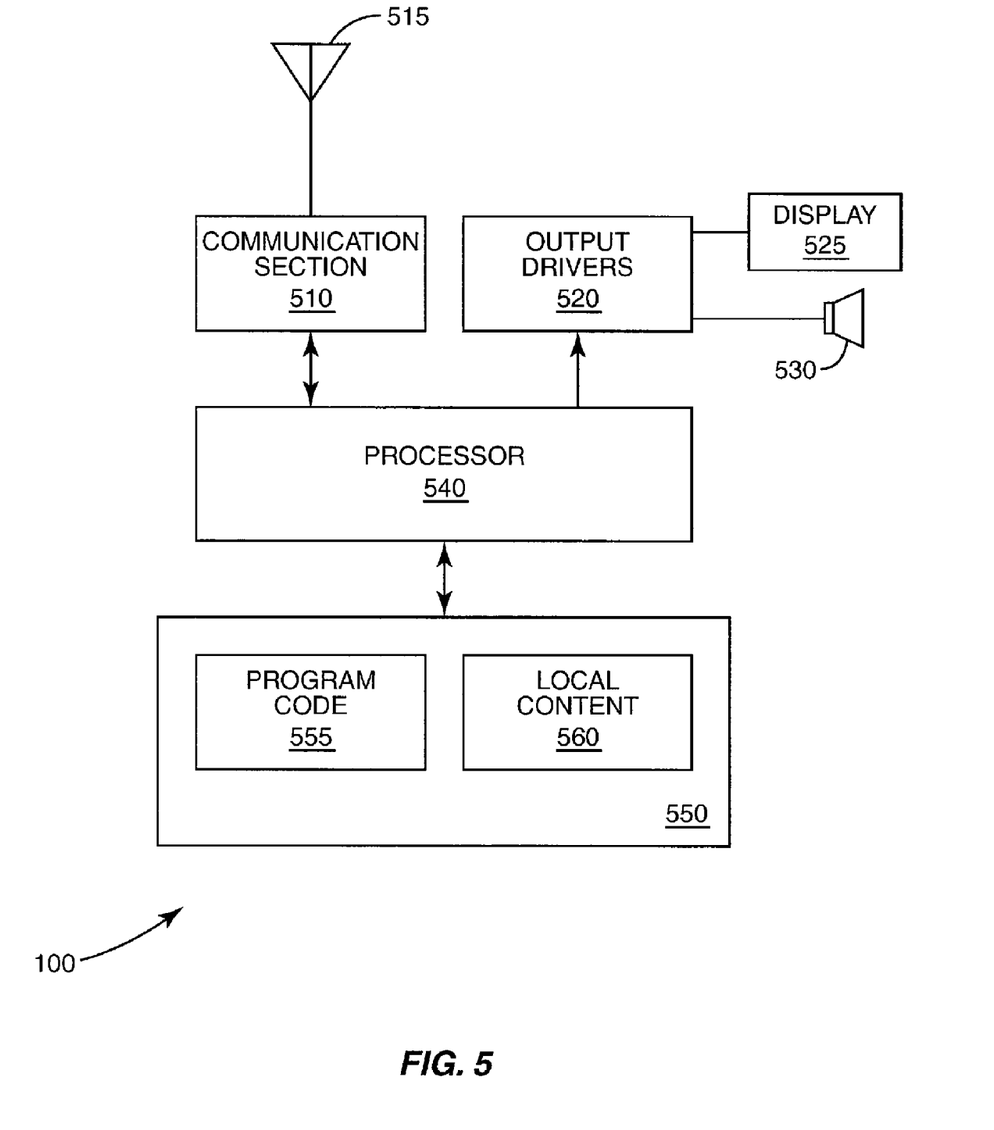
FIG. 5 shows a block diagram illustrating functional components of an exemplary communications device.

FIG. 5 illustrates an exemplary mobile terminal 100 configured to carry out one or more of the methods described above. Mobile terminal 100 comprises a communication section 510 connected to antenna 515; output drivers 520 connected to display 525 and speaker 530; a processor 540; and memory 550. Processor 540 is responsible for the overall operational control of mobile terminal 100 according to programs and instructions 555 stored in memory 550. Processor 540 may comprise one or more microprocessors, microcontrollers, hardware circuits, or a combination thereof. Processor 540 is advantageously configured to carry out the methods described herein. Memory 550 stores data, including locally stored content 560, which may include call attempt descriptors, missed call notifications, and phonebook data. Memory 560 also stores program code 555 needed for operation of mobile terminal 100. Programs stored in memory 550 may include, for example, an operating system program and one or more application programs, including an application configured to carry out the inventive methods described herein. In particular, one or more application programs stored in memory 550 may be configured to receive notification of an uncompleted incoming call attempt, including a calling party identifier, to retrieve a call attempt descriptor associated with the uncompleted incoming call attempt, the call attempt descriptor including charge-back data, and to send a charge-back message comprising all or part of the charge-back data, for use in allocating charges relating to a return call to the calling party. Memory 550 may comprise one or more discrete memory devices, including read-only memory devices, random access memory, flash memory, etc. Memory 550 may further include optical or magnetic storage devices.

Communication section 510 may comprise any known type of wireless transceiver to enable communication with other devices. Communication section 510 may comprise, for example, a cellular transceiver operating according to conventional cellular standards, such as GSM and/or WCDMA, a WiFi transceiver operating according to the 802.11 family of standards, a WiMAX transceiver or a Bluetooth transceiver. Mobile terminal 100 could have multiple transceivers, each operating according to a different communication standard.

The output section of mobile terminal 100 comprises output drivers 520, one or more speakers 530, and one or more video displays 525. Output drivers 520 provide audio and video signals to the speaker 530 and video display 525, respectively. During a communication session with one or more remote terminals, audio and/or video information may be received by communication section 510, processed by processor 540, and routed to output drivers 520 for output to speaker 530 and display 525.

Those skilled in the art will appreciate that the functional blocks described above, although described with reference to a wireless mobile terminal, may be implemented in any of a variety of network-connected devices. Thus, other communications devices, such as Internet phones, network-enabled personal digital assistants, portable computers, and the like, may be configured as described to provide a method for scheduling a time for a communications session when a called party is presently unable or unwilling to accept an incoming call. Indeed, the present invention may be carried out in several other ways than those specifically set forth herein without departing from essential characteristics of the invention. Accordingly, the present embodiments should be considered in all respects as illustrative and not restrictive, and all changes coming within the meaning and equivalency range of the appended claims are intended to be embraced therein.

What is claimed is:

1. A method in a user communication device for allocating communications-related charges, comprising:
    receiving notification of an uncompleted incoming call attempt by a calling party to a called party at the user communications device, said notification including a calling party identifier;
    retrieving a call attempt descriptor associated with said uncompleted incoming call attempt, said call attempt descriptor comprising charge-back data, the charge-back data specifying how charges are to be allocated between the calling and called parties; and
    in response to an initiation of a return call to the calling party, sending a charge-back message, comprising all or part of the charge-back data, for use in allocating charges relating to said return call.

2. The method of claim 1, wherein retrieving a call attempt descriptor comprises extracting the call attempt descriptor from said notification.

3. The method of claim 1, wherein retrieving a call attempt descriptor comprises receiving an electronic message and extracting the call attempt descriptor from the electronic message.

4. The method of claim 1, wherein retrieving a call attempt descriptor comprises sending a descriptor request to a server, said descriptor request comprising the calling party identifier, and receiving the call attempt descriptor in response to the descriptor request.

5. The method of claim 1, further comprising initiating the return call to the calling party, responsive to user input, using the calling party identifier.

6. The method of claim 1, wherein the call attempt descriptor further comprises a call-back identifier, and wherein the method further comprises initiating the return call to the calling party, responsive to user input, using the call-back identifier.

7. The method of claim 1, wherein the call attempt descriptor further comprises a charge-back message address, and wherein sending a charge-back message comprises sending the charge-back message to the charge-back message address.

8. The method of claim 1, further comprising electronically signing all or part of the charge-back message before sending the charge-back message.

9. The method of claim 1, wherein the call attempt descriptor further comprises one or more suggested times for returning the call, and wherein the method further comprises displaying the suggested times using a user interface of the user communications device.

10. A method for allocating communications-related charges, comprising:
generating a call attempt descriptor in response to an uncompleted call attempt from a calling party to a called party, said call attempt descriptor comprising charge-back data, the charge-back data specifying how charges are to be allocated between the calling and called parties;
providing the call attempt descriptor to the called party's communication device;
receiving a charge-back message from the called party's communication device, said charge-back message including all or part of the charge-back data;
allocating charges relating to a call from the called party to the calling party, based on the charge-back data.

11. The method of claim 10, wherein providing the call attempt descriptor comprises sending an electronic message including the call attempt descriptor to the called party's communication device.

12. The method of claim 10, wherein providing the call attempt descriptor comprises storing the call attempt descriptor in a database accessible to the called party's communication device.

13. The method of claim 12, wherein providing the call attempt descriptor further comprises receiving a descriptor request from the called party's communication device and sending the call attempt descriptor to the called party's communication device in response to the descriptor request.

14. The method of claim 10, wherein the charge-back message comprises electronically signed data and wherein allocating charges relating to a call from the called party to the calling party comprises authenticating the charge-back message, using the electronically signed data, and selectively allocating charges to the calling party, based on said authentication.

15. The method of claim 10, wherein the charge-back message comprises a priority code derived from the call attempt descriptor, and wherein the method further comprises routing the call from the called party to the calling party according to the priority code.

16. A user communications device, comprising:
a communications section configured to receive and place calls and to send and receive electronic messages; and
a processor configured to:
control the communications section;
receive notification of an uncompleted incoming call attempt by a calling party;
retrieve a call attempt descriptor associated with the uncompleted incoming call attempt;
initiate a return call to the calling party, using the communications section; and,
using the communications section, send a charge-back message, the charge-back message comprising charge-back data included in the call attempt descriptor for use in allocating charges related to the return call, the charge-back data specifying how charges are to be allocated between the calling and called parties.

17. The user communications device of claim 16, wherein the processor is configured to retrieve the call attempt descriptor by extracting the call attempt descriptor from an electronic message received via the communications section.

18. The user communications device of claim 16, wherein the processor is configured to retrieve the call attempt descriptor by sending a descriptor request to a server, using the communications section, and receiving the call attempt descriptor in response to the descriptor request.

19. The user communications device of claim 16, wherein the processor is configured to send the charge-back message to a charge-back message address included in the call attempt descriptor.

20. A communications system comprising:
a server;
a first user communications device associated with a first user; and
a second user communications device associated with a second user and configured to:
receive notification of an uncompleted incoming call attempt from the first communications device;
retrieve a call attempt descriptor associated with said uncompleted incoming call attempt, said call attempt descriptor comprising charge-back data; and,
in response to an initiation of a return call to the first user, send a charge-back message to the server, the charge-back message comprising all or part of the charge-back data, for use in allocating charges relating to said return call.

* * * * *